US012619841B2

(12) United States Patent
Phoulady et al.

(10) Patent No.: US 12,619,841 B2
(45) Date of Patent: May 5, 2026

(54) TERAHERTZ-READABLE LASER IMPLEMENTED MARKS

(71) Applicants: University of Connecticut, Farmington, CT (US); Femtoinnovations, LLC, Storrs, CT (US)

(72) Inventors: Adrian Phoulady, Willimantic, CT (US); Pouria Hoveida, Vernon, CT (US); Hongbin Choi, Jackson Heights, NY (US); Nicholas May, Mansfield Center, CT (US); Sina Shahbazmohamadi, Stamford, CT (US); Pouya Tavousi, Somerville, MA (US); Daniel Dimase, East Greenwich, RI (US)

(73) Assignees: UNIVERSITY OF CONNECTICUT, Farmington, CT (US); FEMTOINNOVATIONS, LLC, Storrs, CT (US)

( * ) Notice: Subject to any disclaimer, the term of this patent is extended or adjusted under 35 U.S.C. 154(b) by 0 days.

(21) Appl. No.: 18/793,611

(22) Filed: Aug. 2, 2024

(65) Prior Publication Data

US 2025/0045542 A1 Feb. 6, 2025

Related U.S. Application Data

(60) Provisional application No. 63/517,173, filed on Aug. 2, 2023.

(51) Int. Cl.
*G06K 7/10* (2006.01)
(52) U.S. Cl.
CPC ................................. *G06K 7/10366* (2013.01)

(58) Field of Classification Search
CPC .................................................. G06K 7/10366
See application file for complete search history.

(56) References Cited

U.S. PATENT DOCUMENTS

| | | | | |
|---|---|---|---|---|
| 10,639,746 | B1 * | 5/2020 | Nashner | .............. B23K 26/354 |
| 2009/0302123 | A1 * | 12/2009 | Lugt | ................ G06K 19/06037 |
| | | | | 235/494 |

(Continued)

OTHER PUBLICATIONS

Ahmed, W. et al.; "Blockchain-Enabled Supply Chain Traceability in the Textile and Apparel Supply Chain: A Case Study of the Fiber Producer, Lenzing"; Sustainability, vol. 131, Issue 496; DOI: 10.3390/su131910496 (2021).

(Continued)

*Primary Examiner* — Jamara A Franklin
(74) *Attorney, Agent, or Firm* — CANTOR COLBURN LLP

(57) ABSTRACT

A system for authenticating an object includes at least one laser configured for interacting with a tag, the tag comprising structural changes to the object, the structural changes being responsive to terahertz electromagnetic waves. The system may also include a processor configured to (i) receive electromagnetic wave data resulting from interaction of the terahertz electromagnetic waves with the structural changes, (ii) compare the electromagnetic wave data to a reference standard, (iii) determine that the object is authentic in response to the electromagnetic wave data meeting the reference standard, and (iv) determine that the object is not authentic in response to the electromagnetic wave data not meeting the reference standard. A system for reading a tag of an object is further provided.

20 Claims, 9 Drawing Sheets

(56)　　　　　References Cited

U.S. PATENT DOCUMENTS

2015/0262347 A1 * 9/2015 Duerksen ............. G06V 30/224
　　　　　　　　　　　　　　　　　382/182
2022/0399696 A1 * 12/2022 Chevalier ........... H01S 3/09415

OTHER PUBLICATIONS

Beard, M. et al.; "Terahertz spectroscopy"; The Journal of Physical Chemistry B, vol. 106, Issue No. 29; pp. 7146-7159 (2002).
Khalil, G. et al.; "A comparison survey study on RFID based anti-counterfeiting systems"; Journal of Sensor and Actuator Networks, vol. 8, Issue No. 37; 15 pages (2019).
Schuitemaker, R. and Xu, X.; "Product traceability in manufacturing: A technical review"; Procedia CIRP, vol. 93; pp. 700-705 (2020).
Xi, C. et al.; "A framework to assess the security of advanced integrated circuit (ic) packaging"; 2020 IEEE 8th Electronics System-Integration Technology Conference (ESTC). IEEE (2020).

* cited by examiner

First Computer Processing System

Second Computer Processing System

Information

Information → Display

Laser | Beam

THz reader

THz Signal

Tag embedment

Tag reading

F-Theta Lens

Digital Microscope

Height Sensor

Processing Chamber

Optical Path

Laser Source

Vacuum Chuck on XYZ Stages

Resolution and Information Density

Use of x, y and z AND AMPLITUDE

Time of arrival signal

Tag

Information density is dependent on:
- Time delay resolution (~100 fs) and range (~100 ps)
- Detector amplitude resolution and range
- Potentially up to 10^20 different possible states based in a 1mm² area

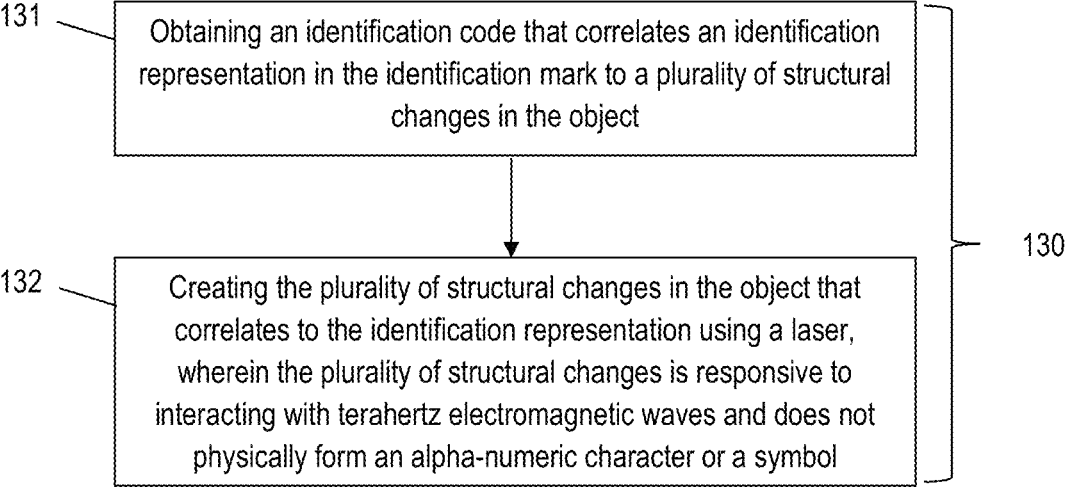

131 — Obtaining an identification code that correlates an identification representation in the identification mark to a plurality of structural changes in the object 132 — Creating the plurality of structural changes in the object that correlates to the identification representation using a laser, wherein the plurality of structural changes is responsive to interacting with terahertz electromagnetic waves and does not physically form an alpha-numeric character or a symbol

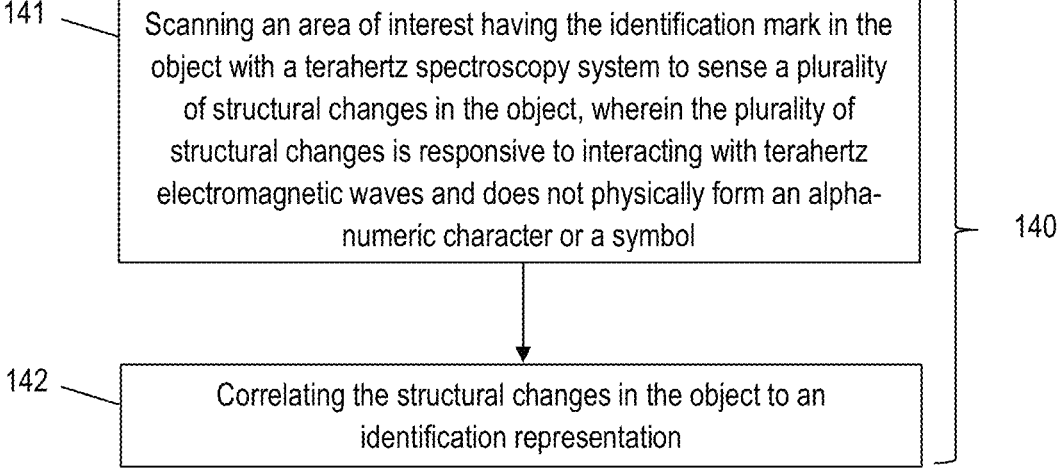

141 — Scanning an area of interest having the identification mark in the object with a terahertz spectroscopy system to sense a plurality of structural changes in the object, wherein the plurality of structural changes is responsive to interacting with terahertz electromagnetic waves and does not physically form an alpha-numeric character or a symbol 142 — Correlating the structural changes in the object to an identification representation

TERAHERTZ-READABLE LASER IMPLEMENTED MARKS

CROSS REFERENCE TO RELATED APPLICATIONS

This application claims the priority benefit of U.S. Provisional Application No. 63/517,173, filed on Aug. 2, 2023, the entire contents of which are incorporated herein by reference.

BACKGROUND OF THE INVENTION

1. Field of the Invention

The invention disclosed herein relates to authentication and traceability, and in particular to methods and apparatus for covert marking of goods.

2. Description of the Related Art

Counterfeit products pose significant economic, security, and health risks. One approach to mitigate these risks involves establishing product provenance by tracing them back to their manufacturing origins. However, current identification methods, such as barcodes and RFIDs, have limitations that make them vulnerable to counterfeiting. Similarly, nonvolatile memories (NVMs), physically unclonable functions (PUFs), and emerging techniques like Diamond Unclonable Security Tag (DUST) and DNA fingerprinting also have their own limitations and challenges. For a traceability solution to gain widespread adoption, it must meet certain criteria, including being inexpensive, unique, immutable, easily readable, standardized, and unclonable.

Thus, what are needed are methods and apparatus that provide inexpensive, unique, immutable, easily readable, standardized, and unclonable solutions for authentication and traceability. Preferably, the markings are clandestine and not readily available or apparent to the unaided observer.

SUMMARY OF THE INVENTION

Disclosed is a solution that uses ultrashort pulsed lasers to create unique, unclonable, and immutable physical tags. These tags can then be read nondestructively using far-field Terahertz (THz) spectroscopy. The disclosed technology may serve as a solution for a wide range of traceability applications.

Disclosed is a system for authenticating an object. The system includes at least one laser configured for interacting with a tag, the tag comprising structural changes to the object, the structural changes being responsive to terahertz electromagnetic waves.

Also disclosed is a system for authenticating an object. The system includes at least one laser configured for interacting with a tag, the tag comprising structural changes to the object, the structural changes being responsive to terahertz electromagnetic waves. The system also includes a processor configured to (i) receive electromagnetic wave data resulting from interaction of the terahertz electromagnetic waves with the structural changes, (ii) compare the electromagnetic wave data to a reference standard, (iii) determine that the object is authentic in response to the electromagnetic wave data meeting the reference standard, and (iv) determine that the object is not authentic in response to the electromagnetic wave data not meeting the reference standard.

Further disclosed is a system for reading a tag of an object. The system includes at least one laser configured for interacting with the authentication tag, the tag comprising structural changes to the object, the structural changes being responsive to terahertz electromagnetic waves, wherein the structural changes are at at least one at a surface of the object or at an area subsurface to the object. The system also includes a processor configured to correlate electromagnetic wave data obtained from received terahertz electromagnetic waves that have interacted with the structural changes to an identification representation of the object. The system can be configured as at least one of a desktop unit, a portable unit, a handheld unit, or a handheld unit in communication with a base unit having components in support of the handheld unit.

BRIEF DESCRIPTION OF THE DRAWINGS

The features and advantages of the invention are apparent from the following description taken in conjunction with the accompanying drawings in which:

FIG. 13 is a flowchart for a method for creating an identification mark in an object; and FIG. 14 is a flowchart for a method for reading an identification mark in an object.

DETAILED DESCRIPTION OF THE INVENTION

Disclosed herein are methods and apparatus for using ultrashort pulsed laser to create unique, unclonable, immutable physical tags, in a rapid and inexpensive fashion. As used herein, the term "tag" refers to an engraving in a surface of an object where the engraving may have a plurality of depths. The techniques employ far-field Terahertz (THz) spectroscopy for reading surface and subsurface tags in a non-destructive fashion. The term "terahertz" as used herein refers to a range of frequencies of electromagnetic waves of about 30 GHz to 10 THz or wave lengths between 1 mm and 30 micrometers (µm). The techniques provide a solution for a wide range of traceability applications.

As disclosed herein, "time-of-arrival" THz imaging provides for distinguishing laser marks with different depths and the resolution of such readings is evaluated. The technology provides for high-information-density marks (i.e., large amounts of data per unit area) as well as capture of a surface profile, consisting of regions with different height values. Additionally, a reading method for capturing subsurface tags is disclosed.

In one embodiment, and as an overview, ultrashort laser pulses may be used for creating high-information density identifier tags and Terahertz spectroscopy may be employed for reading them.

Figure 1:
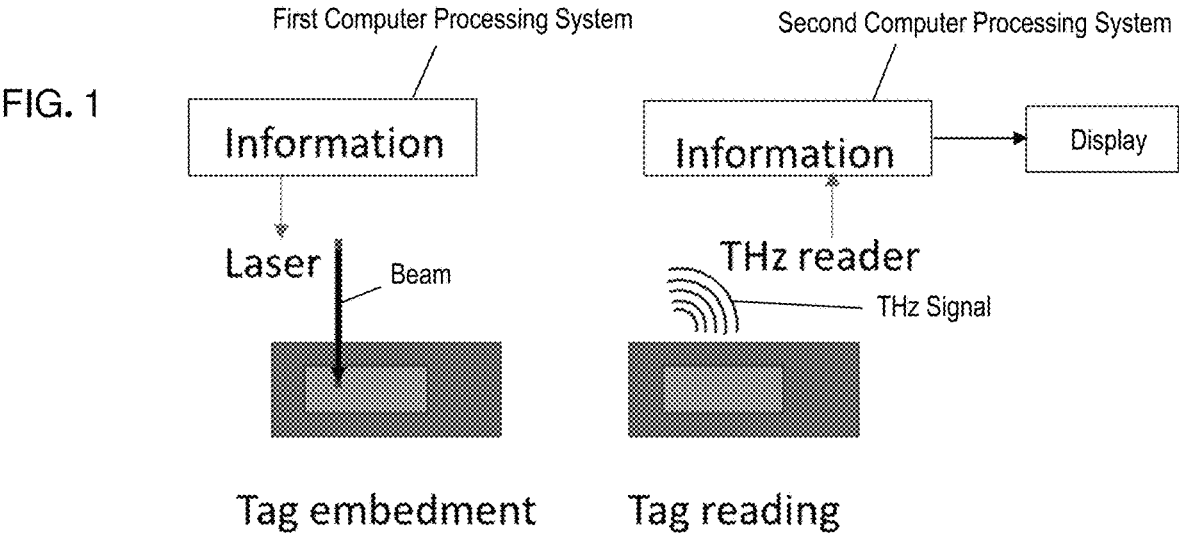
FIG. 1 is a schematic diagram depicting an overview of a tag embedment system and a tag reading system for employing the technology.

In FIG. 1, information may be provided to a laser system for creating the tags. The information may be provided by a first computer processing system coupled to the laser. Similarly, information collected from terahertz spectroscopy may be used for reading the tags. In this example, the information may be obtained and processed by a second computer processing system. The first computer processing system can control the output of the laser for creating a tag with a desired marking. In addition, the first computer processing system can be coupled to an actuator or stage to control positioning of the laser with respect to an area of interest in an object for creating a tag. Other apparatus and methods may be used to position the laser and beam emitted by the laser. A display coupled to the second computer processing system can provide a display of a tag to a user that can be used to verify the authenticity of an object having the tag. In some embodiments, there is one computer system configured with appropriate instructions for either one or both or marking/tagging and reading tags. As discussed herein, "interaction" with a tag may include at least one of creating a tag or mark (i.e., "marking" or "tagging") and reading (i.e., obtaining information from a tag). Generally, interaction involves use of an appropriate laser in a manner as set forth herein.

FIG. 1 provides an overview of the traceability method that includes THz readable laser-engraved identifiers. In various embodiments, different combinations of lasering parameters, tags with different structural properties are obtained. The tags are multimodality readable, where the tag structure can be retrieved at different resolutions using confocal and X-ray microscopy, in addition to THz. Further, a key feature of these tags is that the tags are practicably unclonable, which is achieved due to the complexity associated with creation of the tags. Each tag is uniquely created using a specific combination of a set of lasering parameters, which is impractical to decode by looking at the structure of the tag, due to the complex and unknown relationship between lasering parameters and the exact resulting tag structure as well as due to the fact that there are too many laser combination possibilities to be tested for decoding the techniques for the creation of the tags. It is important to note that the resolution of different reading methods is different in discerning the tag structure variations. Therefore, different reading methods have different sensitivities to the variation of lasering parameters that are used for tag formation. This means that, depending on the size order of the structural variations, higher-resolution reading methods (e.g., confocal and X-ray microscopy) may need to be used for identifying the tag counterfeiting attempts, while lower-resolution methods (e.g., far-field THz) may be used for retrieving tag information in the field.

The techniques disclosed herein were reduced to practice with a nominal system. The femtosecond (fs) machining system employed a Coherent Monaco 1035 nm 40 W laser (model no. 1035-40-40) with a pulse width of 257 fs in one or more embodiments. This laser can generate various pulse repetition rates ranging from single shots to 50 megahertz (MHz). The emitted beam of the laser has a diameter of 2.7±0.3 mm, which was expanded using a beam expander that included a fused silica 75 mm aspherical lens and a fused silica 300 mm convex lens. This expansion resulted in a beam diameter of approximately 11 mm. The expanded beam was then directed to a telecentric fused silica F-Theta lens (TSL-1064-10-56Q-D20) with an effective focal length of 70 mm. This lens configuration provided a theoretical spot size of around 8.5 µm.

Generally, each tag exhibits dimensional aspects. For example, with reference to FIG. 1, each tag exhibits a particular "height." The height may also be considered as a total range of depth within material of the object into which the tag has been included.

Figure 2:
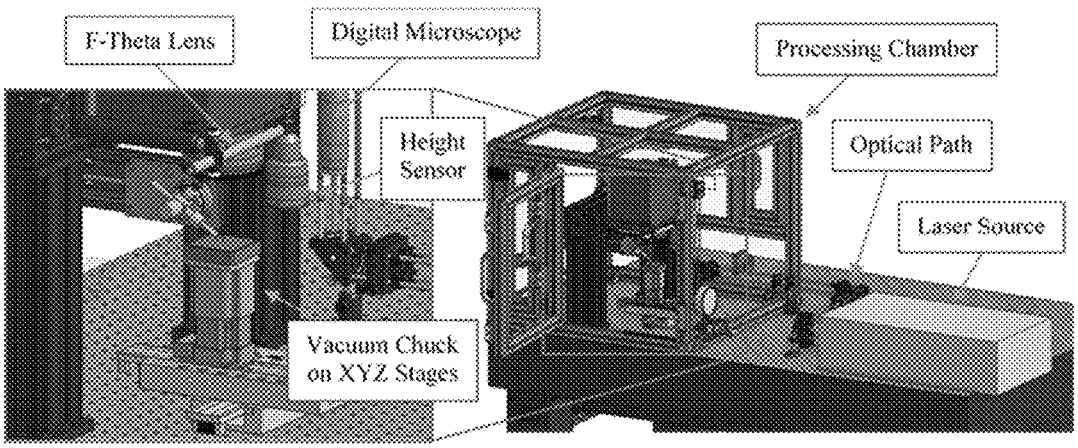
FIG. 2 is a diagram depicting further aspects of an exemplary embodiment of a laser system for engraving structural changes in an object for a tag.

FIG. 2 provides an illustration of aspects of the laser setup used. The processing chamber was used for controlling the environmental condition of lasering (the type of gas, pressure). The height sensor measured the distance of the sample top surface from a reference point. This informed movement of the sample stage such that the top surface of the sample was accurately placed at the focal plane of the laser for desired engraving results.

The femtosecond machining system workflow began by targeting a region of interest (ROI) with a Dinolite digital microscope (AM73915MZT) and moving the sample accurately on an XY plane using Zaber LDA series stages (LDA150A-AE53T10A). Next, the Keyence confocal height sensor (CL-P070) was used to measure height of the sample with low micrometer resolution, after which the Zaber VSR series stage (VSR40A-T3A) brought the sample into laser focus. Finally, the sample was transferred under the F-theta lens for laser ablation to engrave a coded identifier based on different heights.

Figure 3:
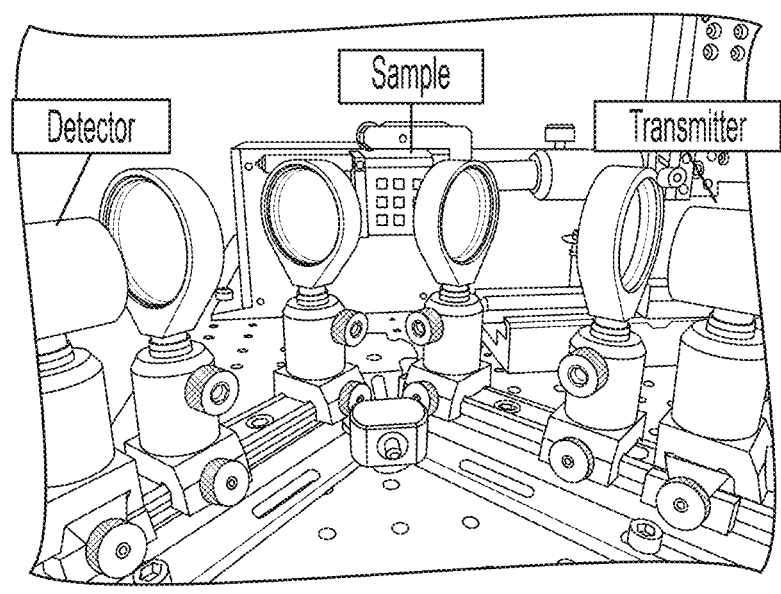
FIG. 3 depicts aspects of an exemplary setup for reading tags.

FIG. 3 depicts aspects of an exemplary system for reading the tags. In this example, THz reflection-mode imaging was used for reading the tags. To obtain the surface profile of the laser-engraved tags, time-of-arrival analysis was conducted. As THz beams reflected by the lower-height areas on the surface will take longer to arrive at the THz receiver, than those that are reflected by the higher-height areas of surface, a height map of the surface structure for the tag was created. As depicted in FIG. 3, two stages were used to move the sample (i.e., object having a tag) in x and y directions for scanning.

In this setup, to determine the depths of the sample, the lowest valley of the terahertz time domain spectroscopy signal was identified for each pixel of the sample image. The location (i.e., time stamp) of this valley indicates the time of arrival of the terahertz signal, which was then used to build a height map of the sample. Since the obtained values corresponded to the distance of the wave path from the source to the sample and back to the detector, any tilting of the sample would result in a skewed height map. To address this issue, the height map was levelled to ensure accuracy in the depth measurements of the sample. Several evaluations were conducted to explore reading laser-engraved tags using THz wavelengths. Given that THz time-of-arrival was chosen as the method for reading the tags, the initial evaluation focused on assessing the ability to distinguish between surface structures with varying average depths. A total of 162 trenches were created on eighteen silicon wafer samples (each sample containing nine trenches) using the laser machining system. As for laser parameters for these engraving trenches, eighty one different combinations were used, resulting in two repeats for each combination for a repeatability investigation. The size of each wafer sample was 3 cm×3 cm and the size of each trench was 4 mm×4 mm. The laser parameters used were: (1) repetition rates of 250 KHz, 500 KHz, and 1 MHz; (2) number of lasering cycles between twenty and 180; and (3) laser power between 1 W and 6.97 W. The term "repetition rate" relates to a frequency or rate of emitted pulses of light from a laser to create a tag. The term "lasering cycles" relates to a number of scans of a region of interest by a laser to create a tag. The average time of arrival for the trenches was measured using the THz-time domain spectroscopy (TDS) system in reflection mode and their average heights was assessed with a laser confocal microscope for a correlative study. FIG. 4 shows one wafer sample with the engraved trenches, for which the height map has been obtained using both confocal and THz-TDS systems. FIG. 5 plots the offset, average time of arrival calculated from the processed THz signal of the imaged trenches, against their average depth as measured from the confocal height map.

Figure 4A:
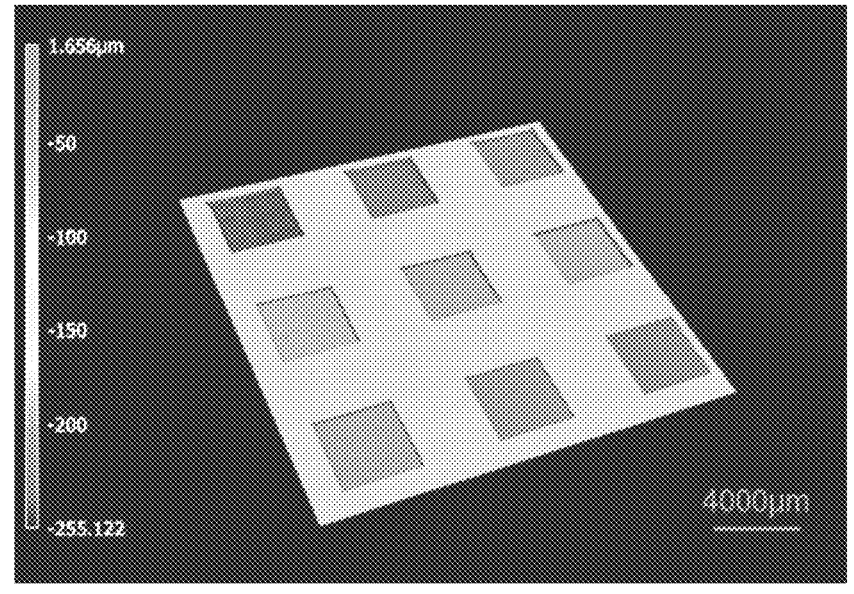
FIGS. 4A and 4B, collectively referred to herein as FIG. 4, illustrates an appearance of created tags as obtained by a laser scanning confocal microscope and a representation of data obtained from a Terahertz reader after analysis.
Figure 4B:
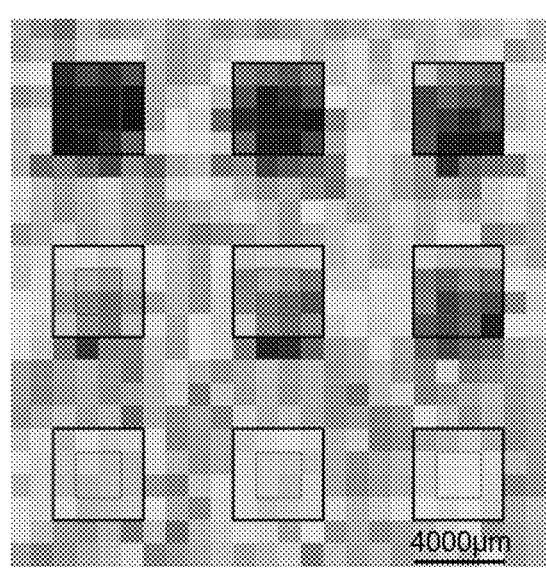
Figure 5:
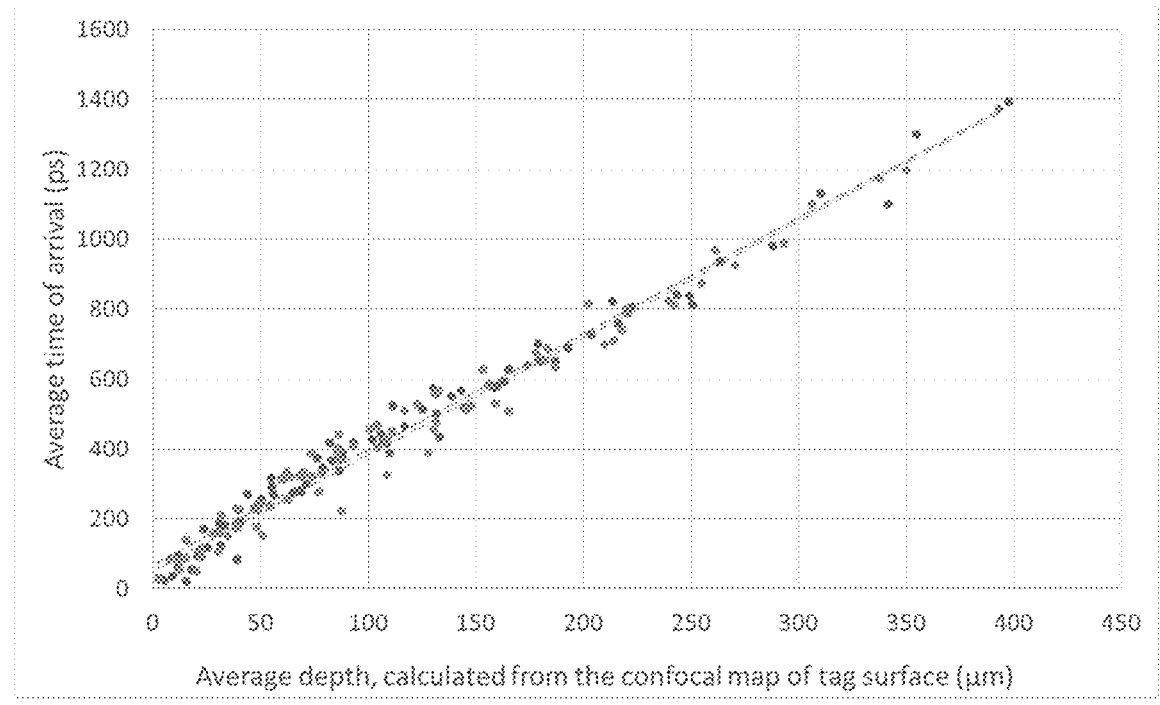
FIG. 5 is a plot of arrival time used for determining a height map.

As shown in FIG. 4A, a color-coded confocal height map of one example wafer sample is illustrated. In FIG. 4B, a color-coded time of arrival mapping is illustrated. Note that the color codes in FIGS. 4A and 4B differ.

In FIG. 5, average time of arrival calculated from the processed THz signal of the imaged trenches is plotted against their average depth as calculated from the confocal height map for the eighty one trenches. The two colors indicate the two repeats. Dotted lines are trendlines for the two repeats.

As can be seen in FIG. 5, there is a linear correlation between the depth of the trench and the time of arrival in the THz reading, which suggest that the depth value, which can be controllably produced by laser, can be used for information storage and retrieval, towards creation of unique identifiers. Further, the extent of deviations from a linear relationship, in FIG. 5, determines the sensitivity of the Terahertz reading to the variations in height.

Figure 6:
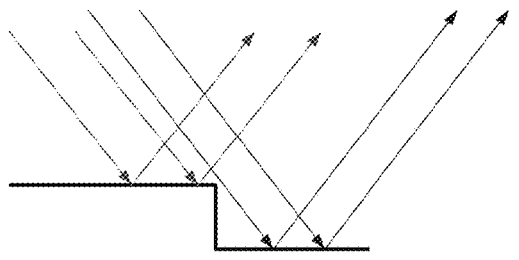
FIG. 6 is an abstraction that depicts reflections of different portions of the beam by surfaces at different heights.

The storage of THz-retrievable information in laser-engraved tags is examined in terms of height-reading resolution in both the vertical and lateral directions. According to the non-limiting embodiment of FIG. 5, THz Time-Domain Spectroscopy (THz-TDS) enables a resolution of 50 μm or better for height measurement in the vertical direction for the reader used. Please note that resolution can be much better such as one micrometer or less using other readers having improved resolution. However, the lateral resolution of Terahertz is relatively low, generally in the order of millimeters. If each pixel is utilized to read only one height value, the resulting lateral resolution would be significantly limited. This is because, out of an information-rich signal collected by focusing the THz beam at one spot, only the time stamp of the lowest valley is extracted to determine the average height. However, if the rather wide THz beam hits a surface in a way that covers both ups and downs, it results in multiple reflections with temporal offsets. This, in turn, produces a THz-TDS signal with multiple major valleys. The time stamps of these multiple identified major valleys correspond to different height values on the surface of interest. Therefore, one pixel can contain more information than just a single height value. To evaluate the feasibility of this approach, an experiment was conducted where the edge of a trench was examined using the Terahertz reading system. The edge was positioned at an approximate 45-degree angle relative to the scanning direction, increasing the chances of capturing scenarios where the THz beam covers both sides of the edge as illustrated in FIG. 6.

Figure 7:
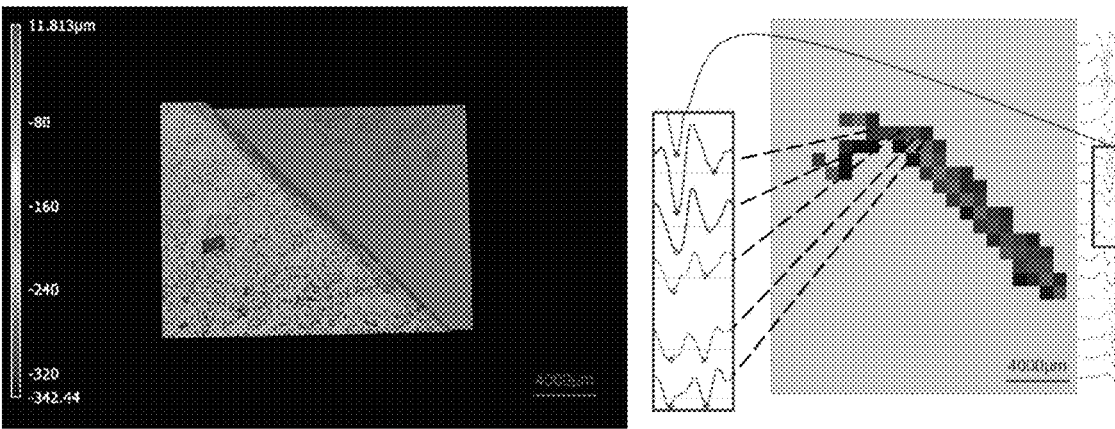
FIG. 7 depicts aspects of a scanning direction for capturing both sides of an edge of a depth change.

FIG. 7 demonstrates a color-coded confocal map of the sample with an edge as well as the corresponding time of arrival map. It is noted that, in order to evaluate a pixel having more information than a single height value mentioned earlier, only the pixels for which two valleys were detected in the signal are displayed in the time-of-arrival map. All other pixels are colored gray. This selective display has resulted in a clear and distinct image of the edge in the time-of-arrival map. On the left, a confocal map of sample with edge is shown; on the right, the time of arrival (only pixels, whose signal has two valleys) is depicted.

Figure 8:
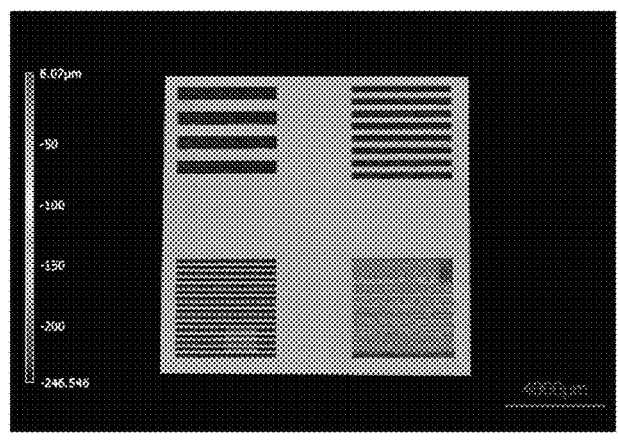
FIG. 8 depicts aspects of a confocal map for stripe patterns and associated terahertz time domain spectroscopy signals.
Figure 8:
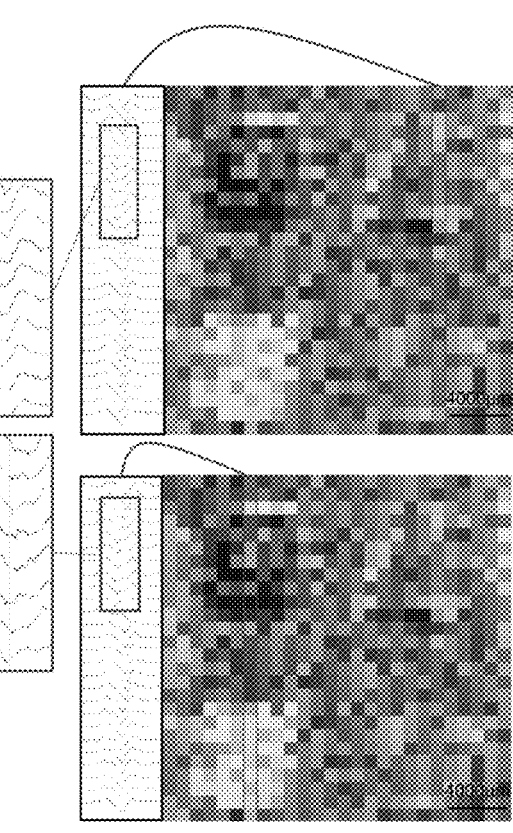

Pushing the limits of the lateral resolution, as described above, was further evaluated by creating stripe pattern, consisting of consecutive ups and downs, followed by a THz measurement. Four stripe patterns were created. The distance between a low-height region and its adjacent high-height region was 1 mm, 500 μm, 300 μm and 100 μm in these four patterns. FIG. 8 shows the confocal map and the THz-TDS signals for these stripe patterns. Presence of two different height values in the sample is clearly observed for in the top two patterns, corresponding to the two major valleys in the THz signal. FIG. 8 depicts aspects regarding stripe patterns, measured by confocal microscopy and THz-TDS.

Figure 9:
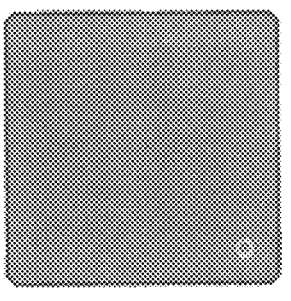
FIG. 9 depicts aspects of a heat map of arrival times and terahertz time domain spectroscopy signals for a specific column of pixels.
Figure 9:
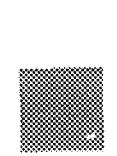
Figure 9:
Figure 9:
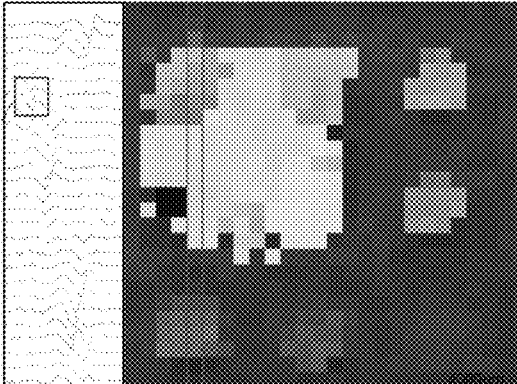
Figure 9:
Figure 9:
Figure 9:
Figure 9:

Given that a main target application for the techniques disclosed herein is to be die-level traceability in microelectronics, readability of the laser-engraved marks through the packaging material was evaluated. In order to explore the use of THz for identifier retrieval through packaging, a piece of packaging material was used to cover some of the laser-engraved trenches on three silicon wafer samples. One example of such a sample is illustrated in the left image of FIG. 9. The right section of FIG. 9 displays the heat map of arrival times for this sample, along with the time-domain signals for a specific column of pixels, indicated by the vertical rectangle in the heat map. The objective was to evaluate whether the correlation between depth and time of arrival still holds in these examples, which would validate the use of THz for identifier retrieval through packaging. Table 1 exhibits the sorted sequence of identifier indices based on depth and time of arrival for the six selected identifiers (the two deepest in each sample). The perfect match observed between the two sorted sequences indicates that THz-TDS is a reliable method for retrieving the height index and, consequently, identifying the tag.

TABLE 1

Selected trenches sorted based on depth and arrival time.

| ID | Row # | Column # | Sample # | Sorted Indices Based on Average Depth | Sorted Indices Based on Average Time of Arrival | Match? |
|----|-------|----------|----------|----------------------------------------|--------------------------------------------------|--------|
| A | 1 | 1 | 1 | C | C | Yes |
| B | 1 | 1 | 2 | F | F | Yes |
| C | 1 | 1 | 3 | B | B | Yes |
| D | 1 | 2 | 1 | E | E | Yes |
| E | 1 | 2 | 2 | A | A | Yes |
| F | 1 | 2 | 3 | D | D | Yes |

Figure 10:
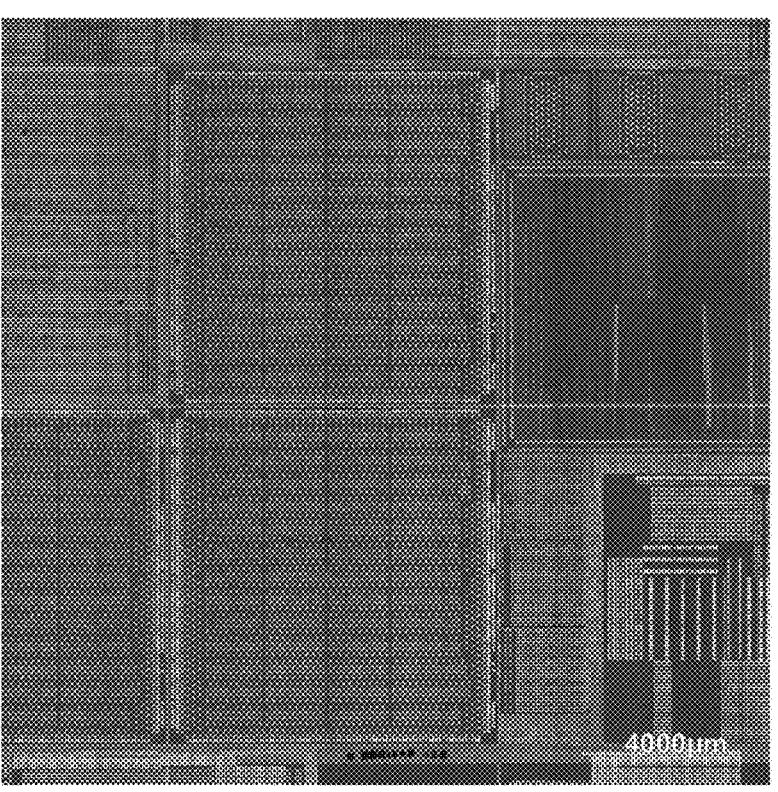
FIG. 10 depicts aspects of reading laser marked tags on a backside of a die containing circuitry.
Figure 10:
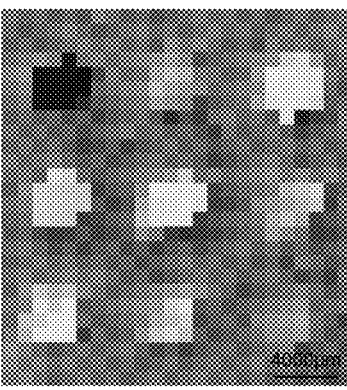
Figure 10:
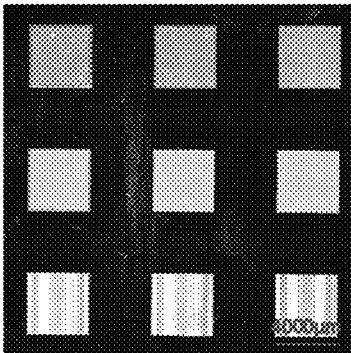

The effectiveness of the techniques has been verified by embedding physical tags using laser marking on the backside of a die, followed by reading the identifiers using THz spectroscopy. The front side of the die, containing circuitry, is shown in the left section of FIG. 10. Nine square-shaped tags with a range of depth values are created on the back side of the die (see FIG. 10 bottom right). The two control parameters for this evaluation are number of lasering cycles, which ranges from 40 to 120 and the repetition rate which ranges from 250 kHz to 1 MHz. Table 2 shows the depth values of these nine tags, characterized using confocal microscopy (in Table 2 KHz=kilohertz). Table 2 further has a column showing the sorted sequence of the indices associated with these tags, based on the depth values. Finally, Table 2 has another column showing the sorted sequence of the indices, based on the arrival times, obtained using THz spectroscopy and reflected in the heat map of FIG. 10. There is a perfect match between the two sorted sequences, indicating that the depth index, which in this example serves as the identifier of these tags, can be retrieved using THz spectroscopy.

location of the displacements and may be inclusive of an amount of the displacements. A controller 115 is coupled to the laser 110 and the stage 114 to control the laser 110 and the stage 114 to produce a plurality of atomic or molecular displacements 116 in accordance with an identification mark coding 117. The identification mark coding 117 correlates an identification representation of the identification mark with the plurality of atomic or molecular displacements 117 (i.e., the plurality of structural changes). The identification representation is an alpha-numeric character or characters or a symbol or symbols that represents the object which has the identification mark. For example, the identification representation can be a manufacturer name or model number of the object that is encoded into the plurality of structural changes. In another example, the identification representation can be a symbol that represents the authenticity of the object.

TABLE 2

Parameters of physical tags embedded on the back side of a die sample

| Tag Index | Tag Row | Tag Column | Number of Cycles | Repetition Rate | Average Depth ($\mu$m) | Indices Sorted Based on Average Depth | Indices Sorted Based on Average Time of Arrival (From Heat Map of Height in FIG. 10) | Match? |
|---|---|---|---|---|---|---|---|---|
| A | 1 | 1 | 120 | 1 MHz | 260 | A | A | Yes |
| B | 1 | 2 | 80 | 1 MHz | 180 | B | B | Yes |
| C | 1 | 3 | 40 | 1 MHz | 86 | D | D | Yes |
| D | 2 | 1 | 120 | 500 KHz | 160 | E | E | Yes |
| E | 2 | 2 | 80 | 500 KHz | 104 | C | C | Yes |
| F | 2 | 3 | 40 | 500 KHz | 47 | G | G | Yes |
| G | 3 | 1 | 100 | 250 KHz | 70 | H | H | Yes |
| H | 3 | 2 | 80 | 250 KHz | 55 | F | F | Yes |
| I | 3 | 3 | 40 | 250 KHz | 23 | I | I | Yes |

Figure 11:
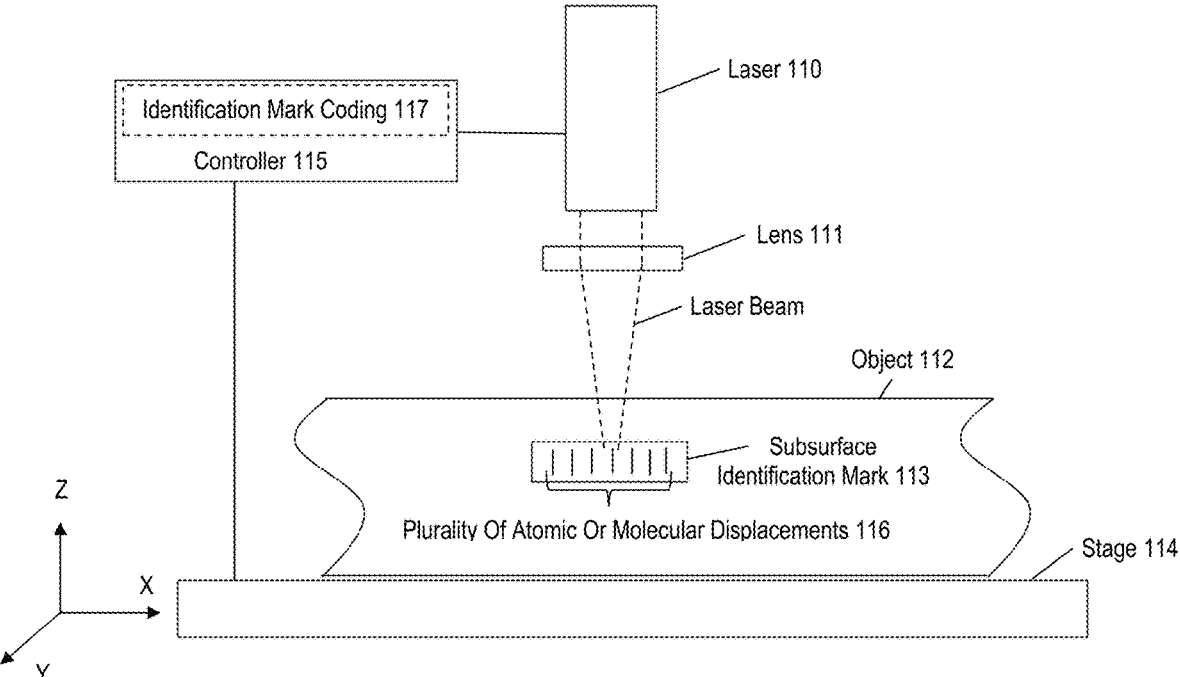
FIG. 11 depicts aspects of creating a subsurface tag.

An alternative to or in addition to disposing the markers or tags on a surface of an object, the markers or tags can be embedded under a surface of the object. In general, tags can be embedded within the material at depths ranging from microns to millimeters (e.g., from near the surface to 5 millimeters in a non-limiting example). This is accomplished by spatially modulating and focusing the laser beam into the object rather than on its surface as illustrated in FIG. 11. Unlike the surface tags, which involve ablating material through laser engraving, embedding subsurface tags involves locally altering the atomic structure without material removal. This results in a unique interaction with a terahertz signal (either reflected or transmitted) from the region containing the subsurface tag, which varies based on the shape, size, and structure of the tag. FIG. 11 illustrates one example of a system for creating a subsurface identification marker 112 in an object 112.

As shown in the example of FIG. 11, a laser 110 emits a laser beam that is focused by a lens 111 to an area subsurface to the object 112. In one or more embodiments, the material of the object itself can contribute to focusing the laser beam. A stage 114 is configured to move the object 112 in an X-Y plane or an X-Y-Z plane relative to the laser beam. Alternatively or in addition, the stage 114 can be configured to move the laser 110 relative to the object 112. The laser beam interacts with subsurface atoms or molecules to displace them. The displaced atoms or molecules can interact with terahertz electromagnetic waves to provide information encoded in reflected or transmitted electromagnetic waves after the interaction. The information relates generally to the Generally, "structural changes" are achievable through molecular displacement. Molecular displacement in a solid may be realized by using a laser. The process involves interaction between laser light and the atomic or molecular structure of the material, leading to changes in the position or behavior of the molecules within the solid. When the laser beam is directed at the material within the object, energy of the laser is absorbed by the material, causing various effects depending on the characteristics of the laser and the properties of the materials that make up the object. One key mechanism is the absorption of photons, which can lead to an increase in the vibrational or translational energy of the atoms or molecules in the material.

The energy of the laser can be concentrated in a small area, causing a rapid rise in temperature and resulting in thermal expansion of the material. This localized heating can cause molecules to move or displace from their equilibrium positions, leading to structural changes or even phase transitions in some cases. For instance, in semiconductors, laser-induced molecular displacement can affect electronic properties, potentially leading to changes in conductivity or the creation of defects.

Additionally, lasers can induce molecular displacement through non-thermal mechanisms such as laser ablation, where intense laser pulses cause the ejection of material from the surface of the solid. This process involves rapid energy deposition, leading to the breaking of atomic bonds and the expulsion of material as ions or molecules.

Interpreting the terahertz signal from a subsurface tag involves multiple parameters. Previously, the focus was primarily on the time of arrival of the signal. However, with the introduction of subsurface tags, both the time of arrival and the signal intensity at different spatial locations are measured. With surface tags, a known sequence of various depths is correlated with a specific alpha-numeric character or symbol. Hence, by measuring the sequence of depths of a surface tag based on time of arrival of the signal, the specific alpha-numeric character(s) or symbol(s) can be determined. With subsurface tags, known depths of structural changes (e.g., changes in atomic or molecular structure) in the embedded tag and a known intensity of the received signal are correlated with a specific alpha-numeric character or symbol. Hence, by measuring both the depths of the structural changes and the intensity of a reflected and/or transmitted signal of the subsurface tag, the specific alpha-numeric character(s) or symbol(s) can be determined. This multi-parameter analysis provides a more detailed and robust method for identifying and verifying the tags.

One of the significant advantages of these subsurface tags is their enhanced security. They are more immutable than surface tags and are invisible to potentially malicious users, making them highly effective for anti-counterfeiting measures.

Figure 12:
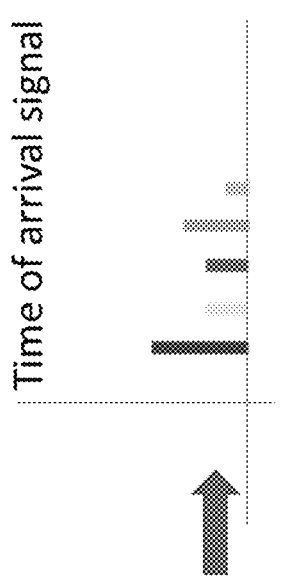
FIG. 12 depicts aspects of information density for one embodiment of a tag.
Figure 12:

Both the surface tags and the subsurface tags have a very low likelihood of being cloneable and are also highly immutable due to a high density of information encoded in the tags whether at the surface or subsurface of the object having the tags. FIG. 12 illustrates one embodiment where the number or possible different states is $10^{20}$ for a one mm$^2$ area of a tag. Hence, by increasing the square area of the tags, the number of possible states increases exponentially making it virtually impossible to clone the tags. As an example in one or more embodiments, an object may have a separate one mm$^2$ area for each of a selected number of digits. Thus, there will be $10^{20}$ possible states for each of the selected number of digits with only one mm$^2$ area designated for each digit. Consequently, increasing the cross-sectional area for each digit will exponentially increase the number of possible states for each digit making it even more unlikely that the identification mark could be cloned. It can be appreciated that the fact that there can be $10^{20}$ different height combinations within 1 mm$^2$ area can also be used for increasing information density, meaning that a 1 mm$^2$ area instead of representing a digit can represent pages of information. The uncolorability of the tags comes from the fact that there are so many different laser parameter combinations (e.g., 1006) that one needs to try to be able to reproduce the same tag which makes tag practically unclonable.

FIG. 13 is a flowchart for a method 130 for creating an identification mark in an object. Block 131 calls for obtaining an identification code that correlates an identification representation in the identification mark to a plurality of structural changes in the object. In one or more non-limiting embodiments, the identification representation is an alpha-numeric character or characters or a symbol or symbols that represents the object which has the identification mark. In one or more embodiments, the identification representation relates to the authenticity of the object that has the identification mark.

Block 132 calls for creating the plurality of structural changes in the object that correlates to the identification representation using a laser, wherein the plurality of structural changes is responsive to interacting with terahertz electromagnetic waves and does not physically form an alpha-numeric character or a symbol. In one or more non-limiting embodiments, the laser system includes a femtosecond laser that emits a laser beam with a femto-second range pulse width and a lens to focus the laser beam on an area of interest of the object to create the identification mark. In one or more embodiments, the area of interest is at a surface of the object and the laser system ablates surface material to form a plurality of depth changes in the surface where the specific depth changes with respect to each other correlate to the identification representation. Alternatively or in addition to the surface identification mark, the area of interest is a subsurface region and the laser system alters an atomic or molecular structure to provide a plurality of structural changes in the subsurface region where the specific atomic or molecular structure changes with respect to each other correlate to the identification representation. It is to be noted that the plurality of structural changes does not physically form an alpha-numeric character or a symbol. If one would view the identification mark having the identification representation using the naked eye or through a magnifying glass or microscope, one would not see any alpha-numeric characters or any symbols.

FIG. 14 is a flowchart for a method 140 for reading an identification mark in an object. Block 141 calls for scanning an area of interest of the object with a terahertz spectroscopy system. Scanning is used to sense a plurality of structural changes in the object, wherein the plurality of structural changes is responsive to interacting with terahertz electromagnetic waves and does not physically form an alpha-numeric character or a symbol. In one or more embodiments, the area of interest is at a surface of the object and the plurality of structural changes is a plurality of depth changes in the surface where the specific depth changes correlate to an identification representation. Alternatively or in addition to the surface identification mark, the area of interest is a subsurface region and the plurality of structural changes is a plurality of atomic or molecular displacements in the subsurface region where the specific atomic or molecular structure changes correlate to an identification representation.

Block 142 calls for correlating the structural changes in the object to an identification representation. In one or more embodiments, a computerized look-up table may be used to correlate the specific atomic or molecular structure changes in the subsurface region to alpha-numeric characters or symbols that make up the identification representation. In general, the identification representation can be compared to an authentic identification representation to determine if the object having the identification mark is authentic or not.

One aspect of novelty of the disclosure lies in using ultrashort pulsed laser technology to create physical tags in a rapid and cost-effective manner. The tags can be embedded in products to serve as identifiers. Far-field THz spectroscopy can be used for reading the information stored in the tags. This approach addresses the limitations of existing techniques and provides a potential universal solution for traceability applications in various industries.

The disclosed techniques are distinguished from existing solutions, including barcodes, RFIDs, non-volatile memories (NVMs), and physical unclonable functions (PUFs), in several ways. Advantages include: (1) inexpensive embedment of identifiers in products; (2) uniqueness of identifiers; (3) immunity to mutation, with any attempt at altering the identifier causing destruction; (4) easy readability in a passive manner (no need for power-up), suitable for field and high-volume applications; (5) standardization of identifiers for widespread adoption; and (6) unclonability of the identifiers.

The disclosed technology has a broad range of applications across various industries where counterfeiting is a concern. For instance: (1) microelectronics-ensuring the authenticity of components in electronic devices, where counterfeit parts can lead to device failures; (2) pharmaceuticals-verifying the authenticity of medications, preventing the distribution of counterfeit drugs; (3) jewelry and luxury products (e.g., time pieces)—authenticating high-value items to protect against counterfeit goods; and (4) critical infrastructure parts—securing components used in critical infrastructure (e.g., aerospace component) to prevent the use of substandard or counterfeit parts.

Tags as disclosed herein may be used to convey information including alphanumeric text information, such as a word or words, graphic information, such as a logo, barcode, QR code or any other suitable information. According to one embodiment, a tag may include "coding information" and/or authentication signatures, for example a watermark. As an example, a watermark may used to provide distribution chain or manufacturer specific information, the date of manufacture, the country of origin, the authorized distribution channel, or any other information that may be informative or useful about the object. The tag might contain a hash value of semantic information conveyed with the object for use in comparison for forgery detection. The object may also carry information in a watermark that may not be discernable without knowledge of the watermark and the ability to read the information included therein. Such indiscernible information may be useful for various applications, for instance with respect to the anti-diversion of branded products.

According to another embodiment, coding information for a tag may be generated from one or more physical characteristics or attributes of the object. The coding information may be used as an input to the tag.

The tag may be created using any of a number of methods. One example of a method for creating the tag may include using a seed or a pseudo-random number generator where the random number is used as a hash or some other one-way function for generating the tag. In another embodiment, content of the tag may be used as a key to "unlock" or otherwise obtain information regarding the object, or vice-versa.

In some embodiments, a system for either one of marking objects or reading tags includes aspects as disclosed herein and configured as a part of a production or assembly line. In some embodiments, the system for marking objects is provided as a desktop unit, or a portable unit. The system may be configured as a handheld unit suitable for field use. In some embodiments, the system includes a hand unit coupled (wired or wirelessly) with a base unit. The base unit may include, for example, power supplies, processing, data storage and other supporting equipment.

In some embodiments, aspects of the teachings herein are provided as software for operation of existing equipment. For example, a laser engraving and/or vision system may be retrofit with appropriate software for at least one of marking and reading the tags. The software may include access to a database with code data for interpretation of tag information.

In addition to anti-counterfeiting, this technology offers the capability to trace parts throughout their lifecycle. By using surface and/or embedded tags, it is possible to monitor and record the history of each part. This traceability allows for the correlation of manufacturing parameters with part performance and failure rates, providing valuable insights into how different manufacturing processes affect the end product. Such information can be used to optimize manufacturing processes, reduce defects, enhance quality, and increase yield.

In support of the teachings herein, various analysis components may be used, including a digital and/or an analog system. For example, first and second computer processing systems and the controller 115 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112 (f) interpretations as "means-plus-function" language unless specifically expressed as such by use of the words "means for" or "steps for" within the respective claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The conjunction "or" when used with a list of at least two terms is intended to mean any term or combination of terms. The conjunction "and/or" when used between two terms is intended to mean both terms or any individual term. The term "configured" relates one or more structural limitations of a device that are required for the device to perform the function or operation for which the device is configured. The terms "first" and "second" and the like are not intended to denote a particular order but rather are intended to distinguish elements. The term "coupled" is intended to be inclusive of being directly coupled or indirectly coupled through an intermediary component. The term "exemplary" is not intended to be construed as a superlative example but merely one of many possible examples.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitations.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for authenticating an object, the system comprising:
   at least one terahertz light source configured for reading a tag, the tag comprising structural changes to the object in a region beneath an exterior surface of the object, the structural changes being responsive to terahertz electromagnetic waves that produce a distinct interaction in a terahertz time-domain and intensity-domain signal in accordance with an identification mark coding.

2. The system according to claim 1, further comprising:
   a laser configured for creating the tag; and
   a controller coupled to the laser and configured to control the laser to produce the tag in accordance with the identification mark coding.

3. The system according to claim 2, wherein the structural changes comprise a plurality of distinct depth levels.

4. The system according to claim 1, wherein the structural changes comprise atomic or molecular displacements disposed in the region below the exterior surface of the object.

5. The system according to claim 1, wherein the structural changes are disposed below a packaging material of the object covering the tag.

6. The system according to claim 1, wherein the tag signifies that the object is authentic in response to electromagnetic wave data obtained from received terahertz electromagnetic waves that interact with the structural changes matching a reference standard.

7. The system according to claim 6, further comprising a processor configured to correlate the electromagnetic wave data to an identification representation of the object.

8. The system according to claim 1, wherein the structural changes do not physically form an alpha-numeric character or a symbol.

9. The system according to claim 1, wherein the tag is embedded in a micro- electronic component.

10. The system according to claim 1, wherein the tag is embedded in a pharmaceutical.

11. The system according to claim 1, wherein the tag is embedded in a piece of jewelry.

12. The system according to claim 1, wherein the tag is embedded in a time piece.

13. The system according to claim 1, wherein the tag is embedded in an aerospace component.

14. The system according to claim 1, wherein the tag comprises a plurality of states and has a state density of at least $10^{20}$ states for each 1 millimeter$^2$ of cross-sectional area.

15. The system according to claim 1, wherein the distinct interaction comprises a distinct reflection.

16. A system for authenticating an object, the system comprising:
   at least one terahertz light source configured for reading a tag, the tag comprising structural changes to the object in a region beneath an exterior surface of the object, the structural changes being responsive to terahertz electromagnetic waves, the structural changes comprising a plurality of distinct depth levels; and
   a processor configured to (i) receive electromagnetic wave data resulting from a distinct interaction of the terahertz electromagnetic waves with the structural changes, the electromagnetic wave data comprising a terahertz time-domain signal and a terahertz intensity-domain signal in accordance with an identification mark coding, (ii) compare the electromagnetic wave data to a reference standard, (iii) determine that the object is authentic in response to the electromagnetic wave data meeting the reference standard, and (iv) determine that the object is not authentic in response to the electromagnetic wave data not meeting the reference standard; wherein the processor is further configured to extract a time- of-arrival time for terahertz interaction waves corresponding to the plurality of distinct depth levels for the terahertz time-domain signal and an intensity for the terahertz interaction waves corresponding to the plurality of distinct depth levels for the terahertz intensity-domain signal.

17. The system according to claim 16, wherein the tag comprises a plurality of states and has a state density of at least $10^{20}$ states for each 1 millimeter$^2$ of cross-sectional area.

18. The system according to claim 16, wherein a distance between adjacent depth steps is less than or equal to 500 micrometers.

19. The system according to claim 16, wherein the distinct interaction comprises a distinct reflection.

20. A system for reading a tag of an object, the system comprising:

at least one terahertz light source configured for interacting with the tag, the tag comprising structural changes to the object in a region beneath an exterior surface of the object, the structural changes comprising a plurality of distinct depth levels that are responsive to terahertz electromagnetic waves;

a processor configured to correlate electromagnetic wave data obtained from a distinct interaction of the terahertz electromagnetic waves with the structural changes to an identification representation of the object, the electromagnetic wave data comprising a terahertz time-domain and intensity-domain signal;

wherein the system is configured as at least one of a desktop unit, a portable unit, a handheld unit, or a handheld unit in communication with a base unit having components in support of the handheld unit.

* * * * *